(12) United States Patent
Scheps

(10) Patent No.: US 6,671,304 B2
(45) Date of Patent: Dec. 30, 2003

(54) AMPLITUDE-MODULATED LASER FOR HIGH-BANDWIDTH COMMUNICATIONS SYSTEMS

(75) Inventor: Richard Scheps, Rancho Santa Fe, CA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 147 days.

(21) Appl. No.: 09/941,190

(22) Filed: Aug. 28, 2001

(65) Prior Publication Data

US 2003/0053509 A1 Mar. 20, 2003

(51) Int. Cl.$^7$ ................................................. H01S 3/094
(52) U.S. Cl. ........................... 372/75; 372/13; 372/26; 372/28; 372/43; 372/92
(58) Field of Search ............................ 372/13, 26, 28, 372/75, 43, 92

(56) References Cited

U.S. PATENT DOCUMENTS

| | | | |
|---|---|---|---|
| 4,139,342 A | * 2/1979 | Sheldrake et al. | 372/19 |
| 4,176,327 A | * 11/1979 | Wayne et al. | 372/18 |
| 4,991,179 A | 2/1991 | Deppe et al. | |
| 5,212,706 A | 5/1993 | Jain | |
| 5,245,622 A | 9/1993 | Jewell et al. | |
| 5,341,390 A | 8/1994 | Yamada et al. | |
| 5,343,487 A | 8/1994 | Scott et al. | |
| 5,363,390 A | 11/1994 | Yang et al. | |
| 5,390,202 A | * 2/1995 | Yan et al. | 372/25 |
| 5,416,582 A | * 5/1995 | Knutson et al. | 356/484 |
| 5,455,836 A | 10/1995 | Li et al. | |
| 5,499,313 A | * 3/1996 | Kleinerman | 250/227.11 |
| 5,513,204 A | 4/1996 | Jayaraman | |
| 5,574,738 A | 11/1996 | Morgan | |
| 5,663,972 A | * 9/1997 | Payne et al. | 372/18 |
| 5,757,831 A | * 5/1998 | Kmetec et al. | 372/29.011 |
| 5,796,761 A | * 8/1998 | Injeyan et al. | 372/3 |
| 5,796,771 A | 8/1998 | DenBaars et al. | |
| 5,802,084 A | * 9/1998 | Bowers et al. | 372/18 |
| 5,959,292 A | * 9/1999 | Duveneck et al. | 250/227.11 |
| 5,982,789 A | * 11/1999 | Marshall et al. | 372/22 |
| 5,982,802 A | 11/1999 | Thony et al. | |
| 6,026,108 A | 2/2000 | Lim et al. | |
| 6,314,115 B1 | * 11/2001 | Delfyett et al. | 359/123 |

* cited by examiner

*Primary Examiner*—Paul Ip
*Assistant Examiner*—Delma R. Flores-Ruiz
(74) *Attorney, Agent, or Firm*—Andrew J. Cameron; Michael A. Kagan; Peter A. Lipovksy

(57) ABSTRACT

The present invention has applications in high-bandwidth communications systems and other applications that utilize modulated optical energy. In one aspect of the invention, a short cavity diode-pumped laser generates optical energy that may be modulated over a wide range of frequencies. In one embodiment, the short cavity diode-pumped laser may be modulated at rates up to 15 GHz. The short cavity diode-pumped laser may include a laser diode modulator and a laser coupled to the laser diode modulator having a cavity lifetime of less than about 100 picoseconds.

20 Claims, 1 Drawing Sheet

AMPLITUDE-MODULATED LASER FOR HIGH-BANDWIDTH COMMUNICATIONS SYSTEMS

BACKGROUND OF THE INVENTION

The present invention relates generally to amplitude-modulated lasers. More specifically, but without limitation thereto, the present invention relates to a short cavity amplitude-modulated laser.

Generally, lasers capable of high modulation rates in the gigahertz range are either laser diodes modulated by electrical drive current or solid-state lasers modulated by an external amplitude modulator such as an acousto-optical modulator. Laser diodes are capable of high modulation rates but have poor coherence, generate optical energy at multiple wavelengths, and have limited output power. On the other hand, acousto-optical modulated lasers have a relatively limited bandwidth and poor optical efficiency.

SUMMARY OF THE INVENTION

The present invention relates to an amplitude-modulated laser capable of relatively high modulation rates, e.g. up to 15 Ghz. It has applications in high-bandwidth communications systems and other applications that utilize modulated optical energy.

In one aspect of the invention, a short cavity diode-pumped laser generates optical energy that may be modulated over a wide range of frequencies. In one embodiment, the short cavity diode-pumped laser may be modulated at rates up to 15 GHz. The short cavity diode-pumped laser may include a laser diode modulator and a laser coupled to the laser diode modulator having a cavity lifetime of less than about 100 picoseconds.

In another aspect of the invention, the short cavity diode-pumped laser is pumped by the laser diode modulator in response to an electrical current or voltage. The laser diode modulator may include a laser diode, a DC bias source coupled to the laser diode, and an electrical modulation source coupled to the DC bias source. The electrical modulation source may be, for example, a signal generator. The laser diode modulator may generate pump energy having a pump wavelength in the range from about 610 nm to about 1000 nm.

In another aspect of the invention, the short cavity diode-pumped laser generates a laser output from a variety of laser gain elements suitable for short cavity laser configurations. In one embodiment, the laser includes a laser gain element of crystalline Nd:YAG or Cr:LiSAF. In another embodiment, the laser gain element contains a laser dye. The laser dye may be contained in a liquid, a gas, a solid, or a gel, and may include rhodamine 700 dye. The laser dye may be contained in a polymethylmethacrylate host having a thickness of about 100 microns.

In a further aspect of the invention, pump energy is focused onto the laser gain element. In one embodiment, the laser includes a focusing lens for focusing pump energy from the laser diode modulator onto the laser gain element.

BRIEF DESCRIPTION OF THE DRAWINGS

The above and other aspects, features and advantages of the present invention will be more apparent from the following more specific description thereof, presented in conjunction with the following drawings wherein.

Corresponding reference characters indicate corresponding elements throughout the several views of the drawings.

DESCRIPTION OF SOME EMBODIMENTS

The present invention has applications in high-bandwidth communications systems and other applications that utilize modulated optical energy.

In one aspect of the invention, a short cavity diode-pumped laser generates optical energy that may be modulated over a wide range of frequencies. In one embodiment, the short cavity diode-pumped laser may be modulated at rates up to 15 GHz. In one such embodiment, the short cavity diode-pumped laser includes a laser diode modulator and a laser coupled to the laser diode modulator having a cavity lifetime of less than about 100 picoseconds.

Figure 1:
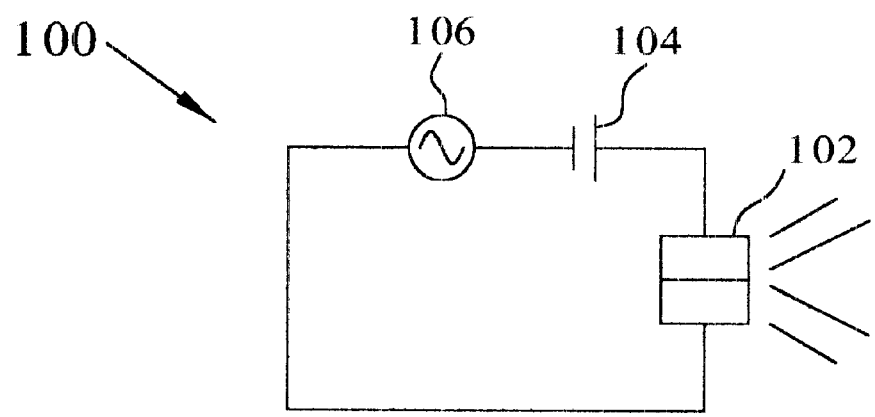
FIG. 1 is a schematic diagram of a laser diode modulator for use with an embodiment of the present invention.

FIG. 1 is a diagram of a laser diode modulator 100. Shown in FIG. 1 are a laser diode 102, a DC bias source 104, and an electrical modulation source 106.

The laser diode 102 may be, for example, a laser diode that generates light having a wavelength in the visible red (610 nm to 690 nm) or in the infrared (690 nm to 1000 nm). The laser diode 102 may also include an array of laser diodes for generating higher laser output power. Other devices that may be modulated to generate light in response to an electrical voltage or current may be used as equivalents for the laser diode 102 as may become apparent to those skilled in the art.

The DC bias source 104 may be a DC power supply, a battery, or any other suitable source of electrical current. The electrical current modulation source 106 may be, for example, a high speed digital signal generator or other device capable of generating a modulation signal sufficient to modulate the laser diode 102.

In this example, the laser diode 102 is connected in series with the DC bias source 104 and the electrical current modulation source 106. The DC bias source 104 provides a bias current that forward biases the laser diode 102 to at least the threshold current of the laser diode 102. The DC bias source 104 also supplies an additional current approximately within the range between the peak positive current and the peak negative current generated by the electrical modulation source 106. For example, the DC bias source 104 may supply a bias current approximately equal to the midpoint between the peak positive current and the peak negative current generated by the electrical modulation source 106. In this example, the bias current ensures that the laser diode 102 is always driven above the threshold current, even when the modulation current from the electrical modulation source 106 is at its peak negative value. Other values of bias current may be used to suit specific applications.

In operation, the laser diode 102 generates light having an intensity that varies according to the output of the electrical modulation source 106.

Figure 2:
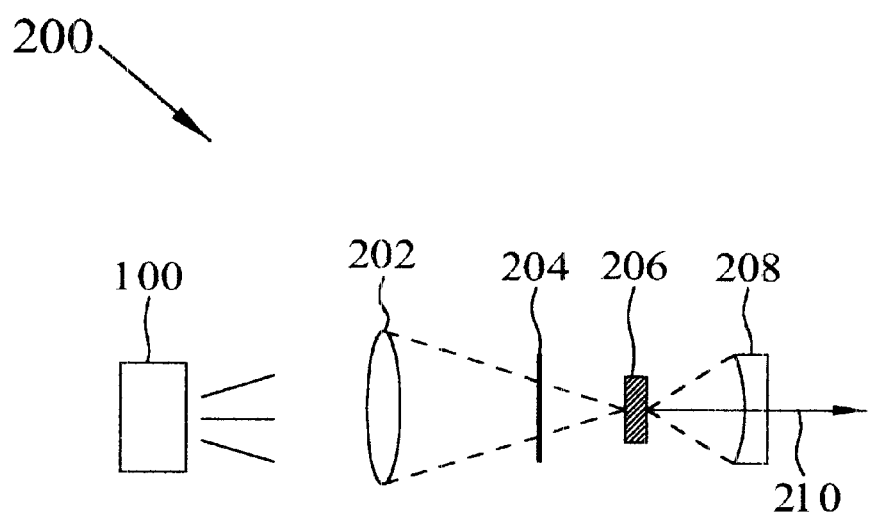
FIG. 2 is a diagram of a short cavity diode-pumped laser according to an embodiment of the present invention.

FIG. 2 is a diagram of a short cavity laser 200. Shown in FIG. 2 are the laser diode modulator 100, a focusing lens 202, an input coupler 204, a laser gain element 206, an output coupler 208, and a laser output 210.

The focusing lens 202 may be, for example, a convex lens and is preferably located as closely as possible to the input coupler 204. The input coupler 204 may be, for example, a plane mirror having a coating that transmits the light output by the laser diode modulator 100 and is highly reflective at the laser wavelength of the laser gain element 206. For a solid state laser gain element, the input coupler 204 may be simply a coating on a plane surface of the laser gain element 206.

The laser gain element 206 may be made according to well known techniques from, for example, a laser dye mixture contained in a solid, liquid, gas, gel, etc., or the laser gain element 206 may be a crystalline laser gain element made of Nd:YAG, Cr:LiSAF, etc. Other types of laser gain elements suitable for short cavity laser configurations may be used for the laser gain element 206 as may become apparent to those skilled in the art.

The output coupler 208 may be made according to well known techniques, for example, a concave mirror having a reflective coating that reflects light from the laser diode modulator 100 that is not absorbed by the laser gain element 206 and is partially reflective at the laser wavelength of the laser gain element 206.

The distance between the input coupler 204 and the output coupler 208 defines the resonant cavity length of the short cavity laser 200. The term "short" in the context of the embodiment of the present invention described herein means a resonant cavity length of no more than about 500 microns.

In operation, the laser diode modulator 100 provides amplitude-modulated pump energy that is focused by the focusing lens 202 through the input coupler 204 onto the laser gain element 206. The laser gain element 206 generates laser light having an amplitude that is proportional to the output of the laser diode modulator 100. The output coupler 208 partially reflects and focuses light at the wavelength of the laser output 210 back into the laser gain element 206 and transmits the remainder as the laser output 210.

The laser diode modulator 100 may modulate the light from the laser output 210 according to the following simplified relation:

$$\frac{\sigma_A I_P}{h\nu_P} n_0 = \frac{\sigma_E I_L}{h\nu_L} n_I \quad (1)$$

where $\sigma_A$ is the absorption cross-section at the pump frequency of the active component in the laser gain element 206, $\sigma_E$ is the stimulated emission cross-section at the laser frequency, $I_P$ is the intensity of the pumping signal from the laser diode modulator 100, $I_L$ is the intensity of the light in the short cavity laser 200, $\nu_P$ is the pump frequency, $\nu_L$ is the laser frequency, $n_O$ is the ground state population, $n_I$ is the upper laser level population, and h is Planck's constant.

Modulating the intensity of the pumping signal $I_P$ from the laser diode modulator 100 modulates the intensity of the light generated from the laser output 210 as a function of time, so that $$\frac{\sigma_A I_P(t)}{h\nu_P} n_0 = \frac{\sigma_E I_L(t)}{h\nu_L} n_I \quad (2)$$

A high modulation rate may be obtained by reducing the cavity lifetime $\gamma_C$, as defined by $$\gamma_C = \frac{2nl}{cT} \quad (3)$$

where n is the average refractive index of the laser resonator cavity, l is the length of the resonator cavity between the input coupler 204 and the output coupler 208, c is the speed of light in a vacuum, and T is the transmission coefficient of the output coupler 208, assuming that the transmission coefficient of the input coupler 204 at the laser frequency $\nu_L$ is zero; otherwise T represents the sum of the transmission coefficients of the input coupler 204 and the output coupler 208. The round trip time for the intensity of the laser light inside the resonator cavity to decay to 1/e of its initial intensity is 2nl/cT. If the output coupler 208 were completely transparent (T=1), then the laser light intensity would decay to 1/e of its initial value in one pass through the resonator cavity. If the output coupler were perfectly reflective (T=0), then the laser light intensity would not decay, and the cavity lifetime $\gamma_C$ would be infinite. In steady state, the resonator round trip loss $L_R$ including the reflectivity $R_C$ of the output coupler 208 is equal to the gain and is given by $$L_R = 2\sigma_E n_I \quad (4)$$

The transmission coefficient T thus equals $1-L_R$. For a transmission coefficient T of 5 percent, the cavity lifetime $\gamma_C$ is 20 times more than the cavity lifetime for a single pass through the resonator cavity.

Because the cavity lifetime $\gamma_C$ limits the frequency at which the light generated from the laser output 210 may be modulated according to $$f = \frac{1}{2\pi\gamma_c} \quad (5)$$

for modulation frequencies up to 1.5 Ghz, $\gamma_C$ must be less than about 100 picoseconds. Higher modulation frequency limits may be obtained by increasing the transmission coefficient T or by reducing the length of the resonator cavity l.

An example of a laser for modulation frequencies of about 15 GHz may be made by using a laser dye element as the laser gain element 206. Because the thickness of a typical laser dye element is only about 100 microns, the input coupler 204 and the output coupler 208 may be placed about 150 microns on each side of the laser gain element 206, reducing the length of the resonator cavity l to less than 500 microns. The term "short cavity" is used to refer to a resonator cavity that is no more than about 500 microns in length. In this example, the resonant cavity length is 150+150+100=400 microns. The output coupler 208 may have a reflectivity in the range of 75 percent to 80 percent. The cavity lifetime $\gamma_C$ for this example would be about 20 picoseconds, resulting in an upper modulation frequency limit of about 7.5 Ghz.

A thickness of 100 microns, i.e., micrometers, is well known in dye jet technology if the laser gain element 206 is a liquid dye. If the laser gain element 206 is a solid dye, for example, rhodamine 700 dye contained in a polymethylmethacrylate (PMMA) host, then the PMMA host may be made to have a thickness of 100 microns according to techniques well known in the art. The fabrication, placement, and alignment of the input coupler 204 and the output coupler 208 has been described previously by Scheps in "Near-IR dye laser for diode-pumped operation", *IEEE Journal of Quantum Electronics*, Vol. 31, No. 126 (1995), incorporated herein by reference.

While the invention herein disclosed has been described by means of specific embodiments and applications thereof, other modifications, variations, and arrangements of the present invention may be made in accordance with the above teachings other than as specifically described to practice the invention within the spirit and scope defined by the following claims.

What is claimed is:

1. A short cavity diode-pumped laser comprising:
   a laser diode modulator for generating modulated pump energy; and
   a laser coupled to the laser diode modulator for receiving the modulated pump energy, the laser diode modulator having a cavity lifetime of less than about 100 picoseconds, the laser comprising:
   a laser gain element for absorbing the modulate pump energy and for generating a laser output signal;
   an input coupler operably coupled to the laser gain element, the input coupler for transmitting the modulated pump energy and for reflecting the laser output signal; and
   an output coupler operably coupled to the laser gain element, disposed apart less than about 500 microns from the input coupler, the output coupler for partially reflecting the laser output signal.

2. The short cavity diode-pumped laser of claim 1 wherein the laser comprises a laser gain element of crystalline Nd:YAG or Cr:LiSAF.

3. The short cavity diode-pumped laser of claim 1 wherein the laser diode modulator comprises:
   a laser diode;
   a DC bias source coupled to the laser diode; and
   an electrical modulation source coupled to the DC bias source.

4. The short cavity diode-pumped laser of claim 3 wherein the electrical modulation source is a signal generator.

5. The short cavity diode-pumped laser of claim 3 wherein the laser diode has a pump wavelength in the range from about 610 nm to about 1000 nm.

6. The short cavity diode-pumped laser of claim 1 wherein the laser gain element contains a laser dye.

7. The short cavity diode-pumped laser of claim 6 wherein the laser comprises a focusing lens for focusing pump energy onto the laser gain element.

8. The short cavity diode-pumped laser of claim 6 wherein the output coupler is partially reflective at a laser wavelength.

9. The short cavity diode-pumped laser of claim 6 wherein the laser comprises a laser dye contained in a liquid, a gas, a solid, or a gel.

10. The short cavity diode-pumped laser of claim 6 wherein the laser dye comprises rhodamine 700 dye.

11. The short cavity diode-pumped laser of claim 6 wherein the laser dye is contained in a polymethylmethacrylate host having a thickness of about 100 microns.

12. A short cavity diode-pumped laser comprising:
    means for generating modulated pump energy; and
    means for generating laser light from the modulated pump energy having a cavity lifetime of less than about 100 picoseconds including:
    laser gain means for absorbing the modulated pump energy and for generating a laser output signal;
    input coupler means for transmitting the modulated pump energy and for reflecting the laser output signal; and
    output coupler means for partially reflecting the laser output signal;
    spacing means for maintaining a spacing between the input coupler means and the output coupler means of less than about 500 microns.

13. The short cavity diode-pumped laser of claim 12 wherein the means for generating laser light comprises a laser gain element of crystalline Nd:YAG or Cr:LiSAF.

14. The short cavity diode-pumped laser of claim 12 wherein the means for generating laser light comprises:
    a laser diode;
    a DC bias source coupled to the laser diode; and
    an electrical modulation source coupled to the DC bias source.

15. The short cavity diode-pumped laser of claim 12 further comprising means for focusing the modulated pump energy onto the means for generating laser light.

16. The short cavity diode-pumped laser of claim 12 wherein the output coupler is partially reflective at a laser wavelength.

17. The short cavity diode-pumped laser of claim 12 wherein the means for generating laser light comprises a laser dye contained in a liquid, a gas, a solid, or a gel.

18. The short cavity diode-pumped laser of claim 17 further comprising means for containing the laser dye in a polymethylmethacrylate host having a thickness of about 100 microns.

19. The short cavity diode-pumped laser of claim 1 wherein the output coupler is reflective of the modulated pump energy.

20. The short cavity diode-pumped laser of claim 12 wherein the output coupler means is reflective of the modulated pump energy.

* * * * *